US012330001B1

United States Patent
Feenstra et al.

(10) Patent No.: US 12,330,001 B1
(45) Date of Patent: *Jun. 17, 2025

(54) FIRE PROTECTION SYSTEMS AND METHODS USING FIRE PROTECTION DEVICES INSTALLED IN PIPE FITTINGS WITH AN INTERNALLY HOUSED SEAL MEMBER

(71) Applicant: Minimax Viking Patent Management GmbH, Bad Oldesloe (DE)

(72) Inventors: Shawn J. Feenstra, Caledonia, MI (US); Gary William Pleyte, Hastings, MI (US); Derek John Scheffers, Mattawan, MI (US)

(73) Assignee: Minimax Viking Patent Management GmbH, Bad Oldelsoe (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/055,095

(22) Filed: Feb. 17, 2025

Related U.S. Application Data

(63) Continuation of application No. 18/514,577, filed on Nov. 20, 2023, now Pat. No. 12,257,465, which is a continuation of application No. 17/915,291, filed as application No. PCT/US2022/016868 on Feb. 17, 2022, now Pat. No. 11,872,425.

(60) Provisional application No. 63/247,630, filed on Sep. 23, 2021, provisional application No. 63/150,421, (Continued)

(51) Int. Cl.
*A62C 31/28* (2006.01)
*A62C 31/02* (2006.01)
*A62C 37/11* (2006.01)

(52) U.S. Cl.
CPC .............. *A62C 31/28* (2013.01); *A62C 31/02* (2013.01); *A62C 37/11* (2013.01)

(58) Field of Classification Search
CPC .......... A62C 31/28; A62C 31/02; A62C 37/11
USPC ...................................... 169/16, 37; 285/355
See application file for complete search history.

(56) References Cited

U.S. PATENT DOCUMENTS

| 1,233,644 A | 7/1917 | Clark et al. |
|---|---|---|
| 1,368,196 A | 2/1921 | Peck |
| 1,681,470 A | 8/1928 | Drees et al. |

(Continued)

FOREIGN PATENT DOCUMENTS

| AU | 2010235944 | 11/2010 |
|---|---|---|
| AU | 2017395012 | 5/2020 |

(Continued)

OTHER PUBLICATIONS

International Searching Authority, International Search Report and Written Opinion in International Appln. No. PCT/2022/016868, May 3, 2021, 21 pp.

(Continued)

*Primary Examiner* — Steven J Ganey
(74) *Attorney, Agent, or Firm* — Perkins Coie LLP

(57) ABSTRACT

Fire protection systems and methods having piping interconnections for connecting a fire protection device to a fluid source. The piping interconnections include a branch connector connected to a pipe header. The branch connector includes a tubular member and an internal annular seal member housed in an internal gasket chamber of the tubular member. The tubular member includes an internal stepless surface between a terminal end of the tubular member and the internal gasket chamber.

15 Claims, 10 Drawing Sheets

Related U.S. Application Data filed on Feb. 17, 2021, provisional application No. 63/150,439, filed on Feb. 17, 2021.

(56) References Cited

U.S. PATENT DOCUMENTS

| | | | |
|---|---|---|---|
| 1,941,174 A | 12/1933 | Jensen | |
| 2,110,127 A | 3/1938 | Hinderliter | |
| 2,374,138 A | 4/1945 | Sanford | |
| 2,399,275 A | 4/1946 | Wenk | |
| 2,712,457 A | 7/1955 | Kimbro | |
| 2,968,440 A | 1/1961 | Cone | |
| 3,100,656 A | 8/1963 | MacArthur | |
| 3,451,483 A | 6/1969 | Houtte | |
| 3,472,534 A | 10/1969 | Stevens | |
| 3,489,441 A | 1/1970 | Malcolm | |
| 3,971,579 A | 7/1976 | Brown | |
| 4,007,877 A | 2/1977 | Jackson | |
| 4,015,321 A | 4/1977 | Witter | |
| 4,056,272 A | 11/1977 | Morrill | |
| 4,073,513 A | 2/1978 | Blakely | |
| 4,296,954 A | 10/1981 | Fujimaki et al. | |
| 4,398,754 A | 8/1983 | Caroleo et al. | |
| 4,529,211 A | 7/1985 | Rodgers | |
| 4,570,983 A | 2/1986 | Olenfalk et al. | |
| 4,629,217 A | 12/1986 | Straub | |
| 4,634,154 A | 1/1987 | Arora et al. | |
| 4,682,797 A | 7/1987 | Hildner | |
| 4,905,766 A | 3/1990 | Dietz et al. | |
| 5,109,929 A | 5/1992 | Spears | |
| 5,149,144 A | 9/1992 | Blakely | |
| 5,390,965 A | 2/1995 | Few | |
| 5,437,481 A | 8/1995 | Spears et al. | |
| 5,447,338 A * | 9/1995 | Kikuchi | F16L 5/02 169/37 |
| 5,743,337 A * | 4/1998 | MacDonald, III | A62C 35/68 169/37 |
| 6,039,120 A | 3/2000 | Wilkins et al. | |
| 6,347,669 B1 | 2/2002 | Sundholm | |
| 6,533,041 B1 | 3/2003 | Jensen | |
| 7,055,865 B2 | 6/2006 | Riordan, III et al. | |
| 7,458,613 B2 | 12/2008 | Spears | |
| 7,900,852 B2 | 3/2011 | Feenstra | |
| 8,038,176 B2 | 10/2011 | Bowman et al. | |
| 8,297,663 B2 | 10/2012 | Spears | |
| 8,459,370 B2 | 6/2013 | Orr | |
| 8,474,472 B2 | 7/2013 | Spears | |
| 8,662,191 B2 | 3/2014 | Orr | |
| 8,931,571 B2 | 1/2015 | Sarkisyan | |
| 9,709,202 B2 | 7/2017 | Spears | |
| 10,744,527 B2 | 8/2020 | Jackson | |
| 11,541,638 B2 * | 1/2023 | Tow | A62C 37/09 |
| 11,701,533 B2 | 7/2023 | Pressnell | |
| 11,872,425 B2 | 1/2024 | Feenstra et al. | |
| 2003/0000694 A1 | 1/2003 | Sweeney et al. | |
| 2008/0185842 A1 | 8/2008 | Blackman et al. | |
| 2011/0214886 A1 | 9/2011 | Orr | |
| 2019/0175968 A1 | 6/2019 | Pressnell | |
| 2020/0282247 A1 | 10/2020 | Batagan | |
| 2020/0330807 A1 | 10/2020 | Silva, Jr. et al. | |

FOREIGN PATENT DOCUMENTS

| | | |
|---|---|---|
| DE | 4129853 | 11/1992 |
| DE | 29606026 U | 7/1996 |
| EP | 0691505 | 1/1996 |
| EP | 2284431 | 2/2011 |
| JP | 2004357981 | 12/2004 |
| KR | 200365477 | 10/2004 |
| KR | 10-2004-0108608 | 12/2004 |
| KR | 200391276 | 8/2005 |
| KR | 20070049269 A | 5/2007 |
| RU | 108544 | 9/2011 |
| RU | 2476754 | 2/2013 |
| WO | WO 2021/186369 | 9/2021 |
| WO | WO 2021/198812 | 10/2021 |

OTHER PUBLICATIONS

European Patent Office, Extended European Search Report in European Application No. 22756963.9, Nov. 22, 2024, 11 pp.

* cited by examiner

FIRE PROTECTION SYSTEMS AND METHODS USING FIRE PROTECTION DEVICES INSTALLED IN PIPE FITTINGS WITH AN INTERNALLY HOUSED SEAL MEMBER

PRIORITY DATA & INCORPORATION BY REFERENCE

This application is continuation of U.S. patent application Ser. No. 18/514,577, filed Nov. 20, 2023, which is a continuation of U.S. patent application Ser. No. 17/915,291, filed Sep. 28, 2022, now U.S. Pat. No. 11,872,425, granted Jan. 16, 2024, which is a 35 U.S.C. § 371 application of International Application No. PCT/US2022/016868, filed Feb. 17, 2022, which claims the benefit of U.S. Provisional Application No. 63/150,421, filed Feb. 17, 2021, U.S. Provisional Application No. 63/150,439, filed Feb. 17, 2021, and U.S. Provisional Application No. 63/247,630, filed Sep. 23, 2021, each of which application is incorporated by reference in its entirety.

TECHNICAL FIELD

The present invention relates generally to pipe fittings for fire protection systems. In particular, the present invention relates to a branch connector for connecting a fire protection device to a fluid supply pipe header in a network of pipes. Fire protection devices include fire protection sprinklers, mist devices, nozzles or any structure configured to distribute a firefighting fluid.

BACKGROUND ART

Fire protection devices, such as automatic fire protection sprinklers, include a solid metal body connected to a pressurized supply of water, and some type of deflector spaced from the outlet to distribute fluid discharged from the body in a defined spray distribution pattern over an area to be protected. To control fluid discharge from the sprinkler body is a fusible or thermally responsive trigger assembly which secures a seal over the central orifice. When the temperature surrounding the sprinkler is elevated to a pre-selected value indicative of a fire, the trigger assembly releases the seal and water flow is initiated through the sprinkler. The spray pattern or distribution of a firefighting fluid from a sprinkler defines sprinkler performance. Several factors can influence the water distribution patterns of a sprinkler including, for example, the shape of the sprinkler frame and the geometry of the deflector. The deflector geometry can define the size, shape, uniformity, and water droplet size of the spray pattern.

The fluid discharge from the sprinkler body also impacts sprinkler performance. The discharge or flow characteristics from the sprinkler body is defined by the internal geometry of the sprinkler including its internal passageway, inlet and outlet (the orifice). Generally, the size of the sprinkler discharge orifice is defined by the nominal K-factor of a sprinkler. For a given sprinkler assembly, the larger the K-factor, the larger the discharge orifice, and the smaller the K-factor, the smaller the discharge orifice. Nominal K-factors for sprinklers listed in the National Fire Protection Association Standard Publication, NFPA 13: Standard for the Installation of Sprinkler Systems, can range from 1 to 30 $[GPM/(psi.)^{1/2}]$ and greater. As is known in the art, the K-factor of a sprinkler is defined as $K=Q/P^{1/2}$, where $Q$ represents the flow rate (in gallons/min GPM) of water from the outlet of the internal passage through the sprinkler body and $P$ represents the pressure (in pounds per square inch (psi.)) of water or firefighting fluid fed into the inlet end of the internal passageway through the sprinkler body. Accordingly, the designed performance of a sprinkler is a function of the supply of a minimum fluid pressure or flow. Thus, any restriction to the fluid flow supply to a sprinkler can negatively impact the performance of a sprinkler.

Automatic fire protection sprinklers are used, for example, in the protection of storage commodities and occupancies. Storage fire protection systems include a network of pipes connected to a firefighting fluid supply source and installed above the storage commodity beneath the ceiling of the occupancy. The piping network includes one or more branch lines coupled to a cross-main which is connected to a fluid supply by a vertical piping riser to supply the branch line(s) with the firefighting fluid. Fire protection sprinklers are connected to the branch lines in an appropriate orientation and at an appropriate sprinkler-to-sprinkler spacing.

To connect the fire protection sprinklers to the branch lines, the branch lines are configured as linear pipe headers with branch connectors extending from the header for receipt and threaded connection of a fire protection sprinkler. Known connectors have one inlet end configured for welded connection to the pipe header and an opposite outlet end with a tapered threaded end for connection of a sprinkler. In order to form a fluid tight seal between the threadedly engaged connector and the sprinkler, a sealing tape or putty is applied to the sprinkler. This can be labor intensive and add to the installation time. Moreover, in order to form a fluid tight seal between the cooperating tapered threads, the sprinkler must be properly torqued using a wrench. Although a fluid tight seal is formed, the sprinkler may not be properly rotationally oriented for sprinkler operation.

There are known branch connectors which eliminate either or both of the tapered thread connection or the need to apply a sealing tape or putty. For example, each of U.S. Pat. Nos. 8,297,663 and 10,744,527, U.S. Patent Publication No. 2019/0175968 and Korean Patent Publication No. KR20040108608A show and describe connectors or adapters for connecting a fire protection sprinkler to a pipe header. Each of U.S. Pat. No. 10,744,527, and U.S. Patent Publication No. 2019/0175968 use an internal straight thread at the outlet to connect the tapered thread of the fire protection sprinkler, which allows the sprinkler to be placed in a desired rotational orientation without the interference of the thread engagement. To form a fluid tight seal between the connector and the sprinkler, each of U.S. Pat. Nos. 8,297,663 and 10,744,527, U.S. Patent Publication No. 2019/0175968 and Korean Patent Publication No. KR20040108608A employ an internal annular seal member which eliminates the need to apply a separate sealing tape or putty. In forming the fluid tight seal, the seal member is compressed against the internal surface of the connector. One area of concern in using an internal sealing member is the need to make sure that the compression of the seal does not restrict the fluid flow supply through the connector to the sprinkler which can negatively impact the discharge and distribution from the sprinkler. Some of the patent documents describe a geometric solution to minimize fluid flow interference. For example, U.S. Pat. No. 10,744,527 describes seal member geometries that, in combination with the internal geometry of the connector, prevent or eliminate restriction to the fluid flow through the connector that would negatively impact sprinkler performance. U.S. Patent Publication No. 2019/0175968 describes an alternate solution in which the connector includes an expansion volume above or axially adjacent the seal member into which the distorted seal member can expand.

The prior art presents connectors that include a seal and provide methods to eliminate or minimize a restrictive flow through the connector; however, the prior art raises additional concerns or problems in the connector structure. For example, U.S. Pat. No. 8,297,663 describes that the seal member is still permitted to distort radially inwardly in the direction of the fluid flow path. U.S. Patent Publication No. 2019/0175968, KR20040108608A and PCT Patent Publication No. WO 2021/186369 add complexity to the connector assembly because each of these patent documents show and describe connectors using a multi-component assembly in addition to the separate annular seal. For example, U.S. Patent Publication No. 2019/0175968 describes a branch connector with a multi-piece tube or housing that uses a threaded connection therebetween that relies on the same annular seal to form a fluid tight seal between the housing components. KR20040108608A shows and describes an internal locking ring in addition to an internal sealing member in order to retain the fire protection sprinkler in the branch connector.

Additionally, branch connectors shown in each of U.S. Pat. Nos. 8,297,663 and 10,744,527, U.S. Patent Publication No. 2019/0175968, Korean Patent Publication No. KR20040108608A and PCT Patent Publication No. WO 2021/186369 add complexity to the fire protection system installation. The connectors described in each of these patent documents receive a pipe fitting or conduit that is connected to the pipe header in order to receive the supplied firefighting fluid. The conduit is inserted into the inlet opening of the connector and firefighting fluid is then introduced internally downstream of the point of insertion. These known connectors have an internal surface that circumferentially surrounds the conduit and includes a stepped surface that provides an internal annular shelf to support the inserted end of the fluid carrying conduit. The annular shelf is defined by a transverse portion of the stepped surface that extends radially inward transverse to the internal passageway of the connector. The annular shelf is also defined by an axially extending portion of the stepped surface that runs parallel to the internal passageway of the connector. Collectively, the transverse and axially extending portions of the stepped surface form the annular shelf as a cantilevered structure off of the internal surface of the connector. These connectors can be affixed to the inserted supply conduit by an adhesive applied internally into the connector.

Other known branch connectors are shown and described in PCT Patent Publication No. WO 2021/198812 that are directly welded to the pipe header and therefore eliminate the need for an inlet surface configured for receipt of a supply conduit. However, the described connector adds complexity to the system assembly and installation because the connector is used with a fire protection sprinkler in which the seal member is attached to the sprinkler. Thus, branch connectors shown and described in PCT Patent Publication No. WO 2021/198812 require a particular seal and sprinkler configuration to form a proper seal. The particular arrangement shows the internal thread of the connector between the fluid inlet and the annular seal. With the seal shown housed near the open end of the connector, the seal can be exposed to the surrounding environment which can damage the seal.

Placement of the annular seal member is important to forming a proper seal regardless of where the seal is in a branch connector. U.S. Pat. No. 10,744,527 describes positioning and orienting an annular seal member internally within the connector to form a proper seal with an inserted fire protection sprinkler. There are known commercially available tools to insert the seal member into the connector. These installation tools employ a plunger and nozzle that engage the connector to insert the seal member. The plunger uses a handle arrangement similar to a caulking gun to drive the plunger to drive the seal member through the nozzle and into the proper place and orientation within the connector. One problem with this known installation tool is that the gun-like handle is bulky and can be difficult in tight spaces in which there may be obstructions.

Given the installation complexity and operational concerns with known branch connectors, there remains a need for a simplified internal sealing assembly and arrangement in branch connectors that can couple fire protection devices to system piping in a sustainable fluid-tight manner while providing adequate fluid flow to the devices for effective fire protection.

DISCLOSURE OF THE INVENTION

Preferred embodiments of fire protection systems and methods are provided in which the systems and methods use preferred piping interconnections between fire fluid devices and a source of firefighting fluid. The piping interconnections include a preferred branch connector for connecting a fire protection device to a pipe header in a network of pipes of the fire protection system. Preferred embodiments of the branch connector include a preferably unitary tubular member having a first end for direct connection to the supply pipe header, a second end for connection to the fluid distribution device, and an internal passageway extending along a central longitudinal axis from the first end to the second end. The internal passageway preferably includes an internally threaded portion proximate the second end for coupling to the fluid distribution device, a fluid intake portion proximate the first end for intake of firefighting fluid from the pipe header and a preferred internal gasket chamber formed between the threaded and fluid intake portions to house an annular seal member. The fluid intake portion preferably extends from the first end to the gasket chamber and is preferably configured for direct fluid contact. Without the need to support an inserted fluid supply conduit, the internal surface defining the fluid intake portion of the branch connector is stepless. That is, as used herein, "stepless" means that the internal surface does not include a surface that extends transversely and axially parallel to the internal passageway to provide an internal annular shelf for support of an inserted conduit. The internal surface in preferred embodiments of the branch connector described herein define the gasket chamber with a first restriction and an axially spaced second restriction of the passageway to support the annular seal member with a relief wall between the first and second restriction to define an expansion volume about the annular seal member.

A preferred embodiment of a fire protection system includes a network of pipes for interconnecting fire protection devices to a source of firefighting fluid. The system and its network of pipes include a pipe header having an internal fluid passageway extending along a longitudinal axis with an opening formed radially about the longitudinal axis. A preferred branch connector is connected to the pipe header. The branch connector includes a unitary tubular member having a first terminal end, and a second terminal end spaced from the first terminal end. The unitary tubular member includes a gasket chamber surface between the first terminal end and the second terminal end with a single annular seal member housed in the tubular member and supported therein by the gasket chamber surface. An internally threaded surface is formed between the gasket chamber surface and the second terminal end, and an internal stepless surface extends from the first terminal end to the gasket chamber surface. The first terminal end is preferably welded about the opening in the pipe header with the stepless surface in fluid communication with the internal fluid passageway of the pipe header. The system also includes a fire protection device coupled to the branch connector. The device includes a frame having a frame body with a frame inlet, a frame outlet and a frame internal passageway extending from the frame inlet to the frame outlet along a device axis. The device can include a fluid deflection member coupled to the device frame and the frame body is in a threaded engagement with the internally threaded surface of the tubular member to compress the annular seal member and establish the fire protection device in fluid communication with the fluid passageway of the pipe header.

Another preferred embodiment of the fire protection system includes a network of pipes for connecting fire protection devices to a source of firefighting fluid. The network of pipes has branch lines that includes a pipe header having internal fluid passageway extending along a longitudinal axis with an opening formed therein radially about the longitudinal axis. The branch lines also include a branch connector having an annular seal member and a unitary tubular member. The tubular member has a first terminal end welded to the pipe header, and a second terminal end spaced from the first terminal end. The unitary tubular member includes an internal surface extending from the first terminal end to the second terminal end and circumscribed about a central axis of the tubular member extending perpendicular to the longitudinal axis of the pipe header. The internal surface includes a gasket chamber surface with the annular seal member housed and supported in the tubular member by the gasket chamber surface, an internally threaded surface between the gasket chamber surface and the second terminal end for engaging a fire protection device, and a stepless surface in fluid communication with the internal fluid passageway of the pipe header. The stepless surface extends from the first terminal end to the gasket chamber surface.

Preferred methods of providing system fire protection include placing an annular seal member in an unloaded condition within an internal gasket chamber formed along an internal surface extending along and circumscribed about a central axis of a preferred unitary tubular member. The gasket chamber is preferably located between an internally threaded surface and an internal stepless surface of the internal surface. The internally threaded surface is between the gasket chamber and a terminal outlet end of the tubular member, and the internal stepless surface preferably extends from the gasket chamber to a terminal inlet end of the tubular member in a welded connection to a pipe header of a network of pipes. The preferred method includes placing the annular seal member in a loaded condition within the internal gasket chamber with a fire protection device frame in threaded engagement with the internally threaded surface and fluid communication with the pipe header.

One preferred embodiment of a branch connector for fire protection systems and methods described herein include an annular seal member having a first end seal surface, a second end seal surface, an inner surface defining an inner gasket diameter and a peripheral surface defining an outer gasket diameter. The tubular member has an inlet for connection to the supply pipe header, an outlet for connection to a fire protection fluid distribution device, and an internal surface defining an internal passageway extending along a central longitudinal axis from the inlet to the outlet. The internal passageway defines a minimum diameter for firefighting fluid to flow therethrough. The internal passageway also includes a preferred gasket chamber formed between the inlet and the outlet with the annular seal member disposed in the gasket chamber. The gasket chamber is preferably defined by a first restriction proximate the inlet; a second restriction proximate the outlet with a relief wall between the first restriction and the second restriction. The first and second restriction engaging the peripheral surface of the annular seal member to support the annular member within the gasket chamber such that the relief wall circumscribes the peripheral surface to define an expansion volume therebetween with a fluid flow path extending from the inlet to the outlet and through the inner surface of the annular seal member. Accordingly, a preferred method of connecting a fire protection fluid distribution device to a fluid supply pipe header is also provided. The preferred method includes providing an inlet end of a tubular member welded to the fluid supply pipe header; and radially expanding the annular seal member with the fluid distribution device threaded into an outlet of the tubular member such that the annular seal member radially expands into an expansion volume defined between two restrictions supporting the seal member about a central longitudinal axis of the tubular member.

Preferred embodiments of a tool for installing an annular seal member in an internal gasket chamber of a branch connector for fire protection fluid distribution devices is also provided. A preferred tool includes a nozzle member having a first end face and a second end face axially spaced from the first end face with an internal passageway for holding an annular seal member therein. The internal passageway extends axially from the first end face to the second end face along a central longitudinal axis. The tool also includes a plunger member having a rod portion with a handle portion at one end of the rod portion and a free end opposite the handle portion. The rod portion is disposed in the internal passageway of the nozzle member for a sliding engagement. The sliding engagement defines a first position of the plunger member with the handle portion axially spaced from the second end face of the nozzle member with the free end of the rod portion proximate the annular seal member within the second internal passageway and a second position of the plunger member with the handle portion proximate the second end face of the nozzle member such that the free end of the rod portion ejects the annular seal member out of the internal passageway. The handle portion is preferably centered and coaxially aligned in each of the first and second positions. The rod portion is affixed centrally to the handle portion so as to expose a base surface of the handle portion. More preferably, the handle portion has a periphery that uniformly circumscribes a central axis of the tool. The handle portion preferably has a diameter greater than the rod portion so that the exposed base surface of the handle portion contacts the nozzle portion in the second position of the plunger member. The first position of the plunger member defines a first operational length of the tool that ranges from three to 2-½ times a length of the tubular member of the branch connector from the inlet to the outlet and the second position defines a second operational length of the tool that ranges from 1.5 to 1 times the length of the tubular member of the branch connector.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
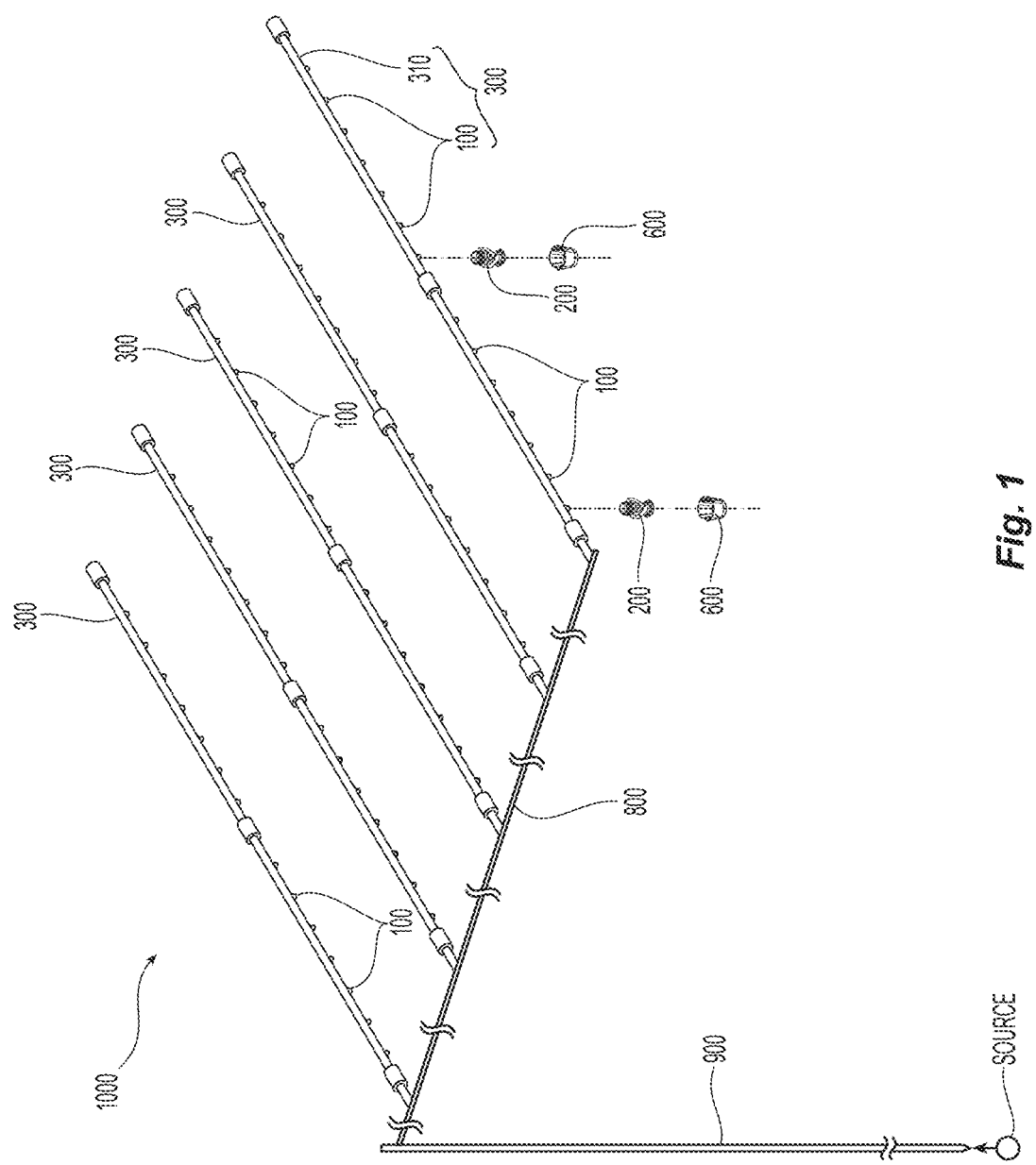
FIG. 1 is an illustrative schematic view of a preferred embodiment of a fire protection system.

Shown in FIG. 1 is an illustrative schematic embodiment of a fire protection system that uses a preferred interconnection between a fire protection device 200 and a network of pipes 1000. Generally, the network of pipes 1000 couples the fire protection devices 200 to a supply of firefighting fluid (SOURCE), for example, a water main. Moreover, the network of pipes 1000 locate the devices 200 over an area or occupancy to be protected. For example, the system can be configured for protection of a storage occupancy by locating the devices in the ceiling above the storage and supplying the devices 200 with water. In the system shown, the network of pipes 1000 includes a vertical riser 900 coupled to the fluid supply source, a cross-member 800 coupled to the riser 900; and a plurality of spaced apart branch pipes 300 to which the devices 200 are connected. Each of the branch pipes 300 includes a pipe header 310 and a plurality of branch connectors 100 into which the devices are threadedly connected. In each branch pipe 300, the branch connectors 100 are welded to the pipe header 310 and are preferably linearly spaced apart from one another. The preferred system 1000 includes a preferred interconnection between externally threaded fire protection devices 200 and internally threaded branch connectors 100 in which the devices can be threaded into the fittings and more preferably hand threaded into the fittings to engage an internal seal to form a fluid-tight engagement and rotationally orient the device in a manner for effective fire protection. As described herein preferred embodiments of a protective installation tool 600 can be used to install the devices in the branch connectors 100.

Figure 1A:
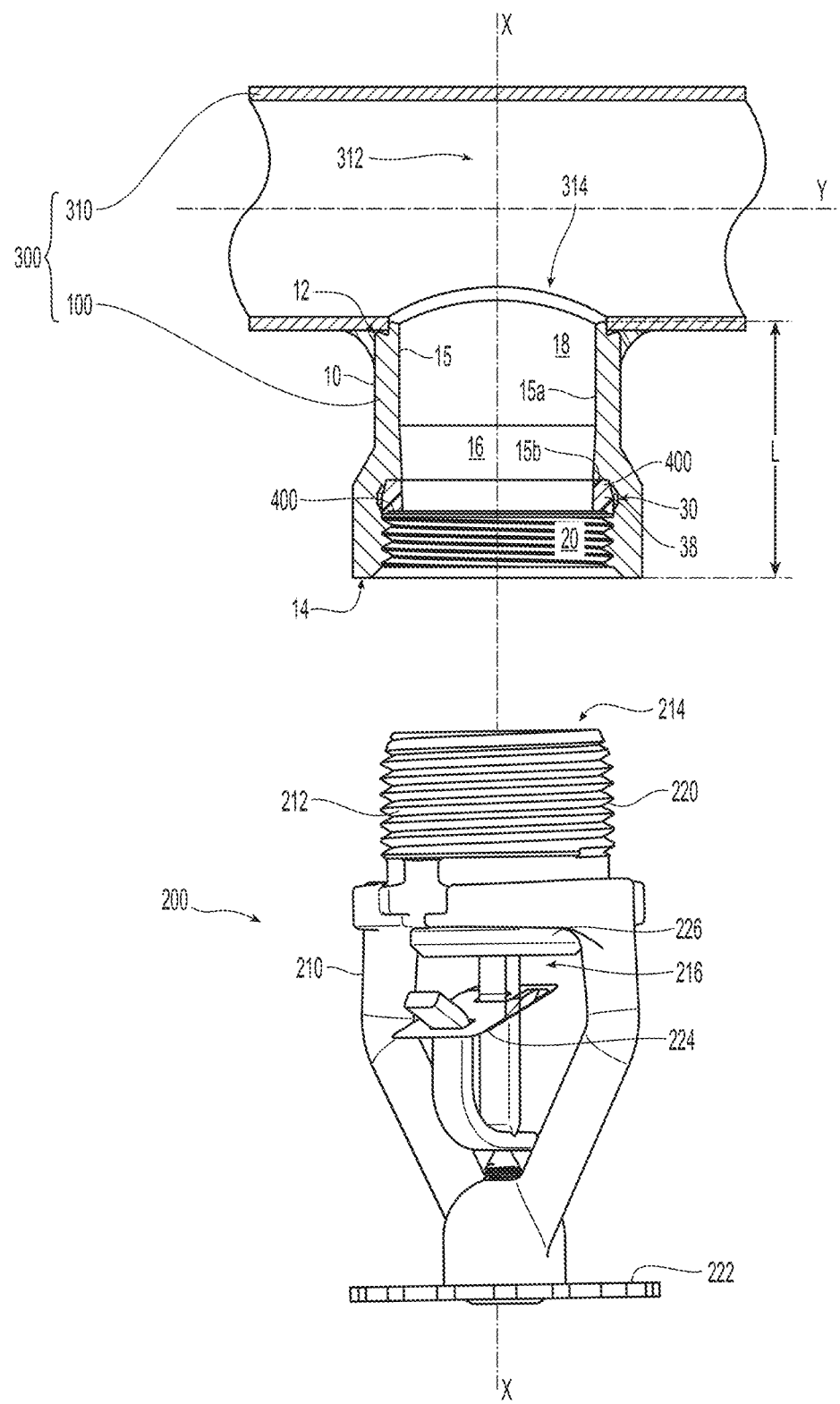
FIG. 1A is an exploded cross-sectional view connecting a preferred illustrative fire protection device to a fluid supply pipe header and preferred branch connector in the system of FIG. 1.

Shown in FIG. 1A is a cross-sectional exploded view of a preferred embodiment of a preferred interconnection in which an externally threaded fire protection device 200, illustratively shown as a sprinkler 200, is threaded into a preferred branch connector 100 to couple and place the sprinkler into fluid communication with a pipe header 310. The branch connector 100 includes a generally tubular member 10 having a first inlet end 12 for fluid connection to the pipe header 310 and a second outlet end 14 for receipt of a fire protection sprinkler 200. The branch connector also includes a preferably single annular seal member 400 housed in a gasket chamber 30 positioned between the first and second ends 12, 14 for forming a fluid tight sealed engagement with the sprinkler 200 that is in a threaded engagement with an internal thread 20 of the tubular member 10. In preferred embodiments of the system, the pipe header 310 has internal fluid passageway 312 extending along a longitudinal axis Y-Y with an opening 314 formed therein radially about the longitudinal axis Y-Y. In the preferred branch connector 100 the tubular member is a preferably unitary tubular member 10 having a first terminal end 12, and a second terminal end 14 spaced from the first terminal end 12. The first terminal end is preferably welded about the opening 314 in the pipe header 310. The unitary tubular member 10 includes an internal surface 15 that is preferably circumscribed about a central tubular axis X-X and the internal surface 15 extends from the first terminal end 12 to the second terminal end 14 to define an internal passage 16 of the tubular member 10. The internal surface 15 preferably includes a gasket chamber surface 30 between the first terminal end 12 and the second terminal end 14 to define the preferred internal gasket chamber for housing and supporting the annular seal member 40 therein. An internally threaded surface 20 of the tubular member is preferably formed between the gasket chamber surface 30 and the second terminal end 14. In preferred embodiments of the tubular member 10, an internal stepless surface 15 extends from the first terminal end 12 to the gasket chamber surface 30 for fluid communication with the internal fluid passageway of the pipe header 310. In the system interconnections, a fire protection sprinkler 200 is in a threaded engagement with the internally threaded surface 20 of the tubular member 10 to compress the annular seal member and establish the fluid communication between the fire protection sprinkler 200 and the fluid passageway 312 of the pipe header 310. With the tubular member preferably welded to the pipe header 310, the stepless surface is in direct contact with the supplied firefighting fluid; and thus, a stepped internal surface for engaging an inserted supply conduit can be eliminated.

Generally, a fire protection device 200 includes a frame 210 having a frame body 212 with a frame inlet 214, a frame outlet 216 and an internal sprinkler passageway 218 extending from the frame inlet 214 to the frame outlet 216 along a central sprinkler axis to define a nominal K-factor of, for example, 8.0 [GPM/(psi.)$^{1/2}$] or greater. The body 212 preferably includes an external thread 220 for forming a preferred threaded engagement with the branch connector 100. The device, such as sprinkler 200 can include a fluid deflection member 222 coupled to the sprinkler frame 210 for distributing firefighting fluid discharged from the frame outlet 216 to effectively address a fire. The sprinkler 200 preferably is configured as an automatic fire protection device in which a thermally responsive assembly 224, in combination with a seal assembly 226, maintains the fluid outlet 216 sealed in an unactuated state. In the presence of a sufficient level of heat, for example a fire, the thermally responsive assembly 224 actuates to release the seal 226 and open the frame outlet 216 to permit the discharge of firefighting fluid. The fluid deflection member 222 can be at a fixed distance from the frame outlet 216 as shown or alternatively be movable, for example, to axially translate with respect to the frame outlet 216 from an unactuated position to an actuated position to distribute the discharged firefighting fluid. Depending upon the configuration of the fluid deflection member, the device 200 can be a pendent, an upright or a sidewall/horizontal device.

The branch connector 100 is preferably a straight fitting or alternatively can be formed as a different type of fitting, such as for example, an elbow fitting or tee fitting to connect an appropriately configured sprinkler. With reference again to FIGS. 1A and 2, preferred tubular member 10 of the branch connector 100 and its internal surface 15 defines the internal passageway 16 preferably extending along the central longitudinal axis X-X from the first end 12 to the second end 14. The internal passageway 16 preferably includes a fluid intake portion 18 proximate the inlet end 12 for intake of firefighting fluid from the pipe header 310. The preferably stepless surfaces 15a, 15b defines the fluid intake portion 18. The internal surface 15 includes the preferred internally threaded portion 20 proximate the outlet end 14 for receipt of and coupling to the fire protection sprinkler 200. The internal passageway 16 preferably includes the gasket chamber 30 formed between the fluid intake portion 18 and the internally threaded portion 20 to house an annular seal member 400. The surfaces defining the chamber 30 preferably include a backstop surface 40 against which the seal member 400 forms a fluid-tight sealed engagement when the seal member 400 is engaged and loaded by the sprinkler 200.

As previously described the tubular member 10 is preferably formed as single-piece, monolithic or unitary structure. Moreover, the tubular member 10 is preferably formed or fabricated from a weldable material such as for example, steel or a weldable grade iron for welded connection to the pipe header 310. In preferred embodiments of the tubular member 10, the first terminal inlet end 12 defines a saddle-shaped surface, as more clearly seen in FIG. 3A, that is circumscribed about the central tubular axis X-X. The preferred saddle-shaped inlet end 12 defines a radius of curvature R about an axis extending perpendicular to and intersecting the central tubular axis X-X. The preferred saddle shaped inlet end 12 is configured to cradle the fluid supply pipe header 310 in a preferred welded connection. Moreover, as seen in FIG. 2, the inlet end surface 12 can be preferably tiered to define a portion that is disposed within the opening of the pipe header 310 and another portion outside the header opening that is incorporated in the preferred welded connection. With reference again to FIG. 3A, the inlet surface 15 is preferably contiguous with the inlet end 12 to define the preferred fluid intake portion 18 of the internal passageway 16 and its first internal diameter Dia1 for fluid communication with the pipe header 310. The inlet end 12 and the inlet diameter Dia1 defines a preferred ratio of radius of curvature R-to-diameter Dia1 that ranges from 1.3:1 to 1:1.

Figure 3A:
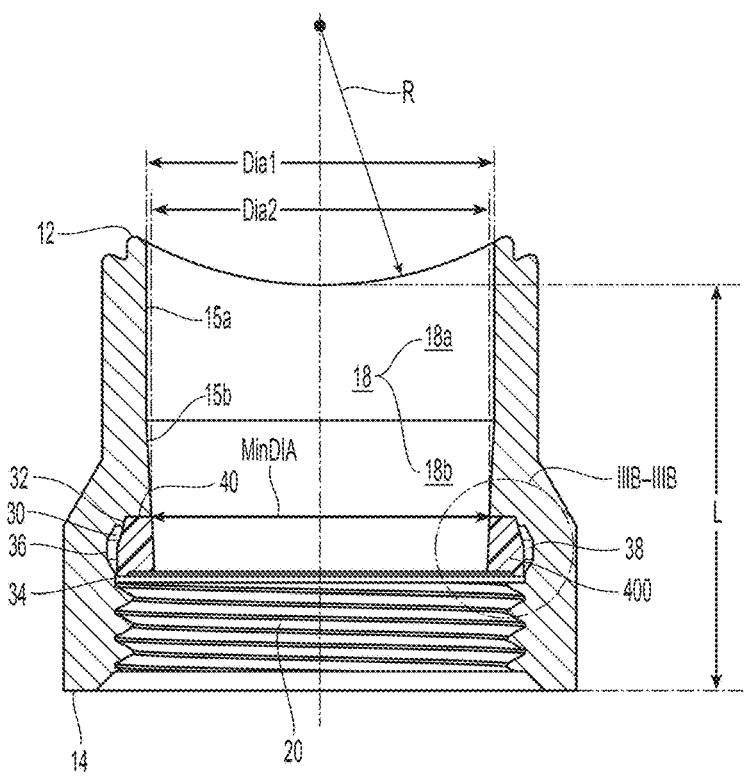
FIG. 3A is a cross-sectional view of the branch connector of FIG. 1A with the annular seal member in an unloaded state.

With reference to FIG. 3A, the fluid intake portion 18 of the tubular member preferably extends from the first inlet end 12 to the gasket chamber 30 and more preferably axially extends from the first terminal inlet end 12, then tapers and terminates at the sealing surface 40 of the gasket chamber 30. In the preferred embodiment, the fluid intake portion 18 includes a first portion 18a in which a first preferably stepless segment 15a of the internal surface 15 defines the preferably constant first internal diameter Dia1 of the passageway 16. A second portion 18b of the fluid intake portion 18 preferably defines a second internal diameter Dia2 that is variable and defined by a second preferably stepless segment 15b of the internal surface 15 that is preferably contiguous with the first segment. The second segment 15b of the stepless internal surface 15 defining the second portion 18b of the fluid intake portion 18 defines a profile from the first segment 15a to the backstop surface 40 to define the tapering second portion 18b of the fluid intake portion 18.

The second portion 18b of the fluid intake portion 18 preferably forms a tapering portion of the internal passageway 16 that tapers between the first portion 18a of the fluid intake portion 18 and the backstop surface 40 and preferably varies from a maximum equal to the first diameter Dia1 to a minimum equal to the minimum diameter MinDIA of the internal passageway 16. In the preferred tubular member 10, the first segment 15a of the internal surface 15 extends parallel to the central axis X-X to define a preferred constant diameter first part 18a of the fluid intake portion 18 over the first segment 15a. The first segment 15a is preferably between and contiguous with each of the first end 12 of the tubular member 10 and the second segment 15b of the internal surface. The second segment 15b is skewed with respect to the central axis X-X to define a preferred constant slope between and contiguous with each of the first segment 15a and the backstop surface 40 of the gasket chamber 30. Accordingly, the second segment 15b defines the preferred narrowly tapering diameter part 18b of the fluid intake portion 18 with the second segment 15b being between and contiguous with each of the first segment and the backstop surface 40 of the gasket chamber.

The second outlet end 14 of the tubular member 10 and the internally threaded portion 20 of the internal passageway 16 are preferably configured for receipt and connection with the sprinkler 200 of a nominal size. Accordingly, preferred embodiments of the branch connector 100 at the outlet end 14 can define a nominal size or diameter ranging from ½ inch to 1½ inch and more particularly any one of ½ inch, ¾ inch, and even more preferably any one of a nominal 1 inch, 1¼ inch or 1½ inch and suitable for receipt of a fire protection device having a nominal K-factor of 8.0 [GPM/(psi.)$^{1/2}$] or greater and more preferably, any one of 22.4; 25.2; 28.0; 30.5; 33.6 [GPM/(psi.)$^{1/2}$]. The overall length L of the branch connector between the inlet end 12 and the outlet end 14 preferably ranges from 1 inch to 1½ inch. The second terminal outlet end 14 is preferably defined by a circular planar surface circumscribed and disposed orthogonally with respect to the central axis X-X. The length L of the branch connector 100 is preferably defined between the outlet end 14 and a mid-point of the concave portion of the saddle-shaped inlet 12. Moreover, the overall length L of the branch connector 100 preferably corresponds or varies with the outlet nominal diameter size. For example, for a nominal outlet diameter of 1 inch, the length L is preferably 1¼ inch, where the nominal outlet diameter is ¾ inch, the length L is preferably 1⅛ inch and where the nominal outlet diameter is ½ inch, the length L is preferably 1¹/₁₆ inch. Accordingly, the preferred tubular member 10 defines a preferred ratio of Length L-to-nominal outlet diameter that ranges from 1.25-2.1, can be any one of 1.25:1; 1.125:1 or 1.06:1 and is preferably 1.25-1.

With reference again to FIGS. 1A, 2 and 2A, the frame body 212 of the sprinkler 200 includes an external thread 220 for a threaded engagement with the internally threaded portion or surface 20 of the tubular member 10 with the frame body 212 in sealing engagement with the annular seal member 400. The annular seal member 400 is axially located between the fluid intake portion 18 and the threaded engagement, to place the internal passageway 218 of the sprinkler 200 in fluid communication with the internal passageway 16 of the tubular member 10. Generally, the external thread 220 of a fire protection sprinkler 200 is of a tapered form, for example, NPT thread. The internal threaded portion 20 preferably includes an internal straight thread 22 for receipt of the tapered sprinkler thread of the sprinkler 200. The threaded engagement remains sealed from fluid supplied through the inlet end 12 by the proper fluid tight seal sealed engagements between the seal member 400 and the backstop surface 40 and between the sprinkler 200 and the annular seal member 400. The internal diameter ID of the internal straight thread 22 can be defined by any one of the pitch diameter, minor diameter or major diameter of the internal thread 22 provided the straight thread engages the tapered thread of the sprinkler 200. The internal straight thread can be for example, a 1-11.5 NPSH Thread; a ¾-14 NPSH Thread; or a ½-14 NPS Thread for mating with a correspondingly nominal 1 inch, ¾ inch or ½ inch fire protection sprinkler.

Use of the preferred straight internal thread permits the tapered threaded sprinkler 200 to be rotatable about the axis X-X within the connector 10 such that the device 200 can be rotationally oriented, preferably by hand, in any desired position while forming a proper fluid tight seal. More preferably, the internal thread portion 20 and the seal member 400 form a proper fluid tight seal engagement with the device 200 upon sufficient rotation by hand of the device following contact with the seal member 400. Accordingly, in the preferred branch connector 100, the sprinkler 200 deforms the annular seal member 400 to provide a leak-proof fluid-tight seal between the device 200 and the connector 10 requiring a preferred lower torque as opposed to the higher torque that would be required in a typical fire protection sprinkler installation using a wrench and cooperating tapered threads. The preferred connector 10 can provide for a fluid tight seal between the connector 10 and a threaded device 200 under a fluid pressure of up to 200 psi or more, for example, pressures of up to and including at least 175 psi.

Alternatively or additionally, the preferred interconnection can include a preferred hand operated protective device 600 disposed about the sprinkler 200 for installing the fire protection sprinkler 200. Shown in FIGS. 2B, 2C and 2D are varying views, including exploded, partial cross-sectional and perspective views, of the sprinkler assembly 200 and a protective device 600 for installation in the preferred branch connector 100. Preferred embodiments of the protective device 600 protects the sprinkler 200 from unintentional impact and damage during storage, transport, installation and/or when awaiting to be placed into service. Moreover, the protective device 600 also serves as a tool for installing the sprinkler 200 into the branch connector 100. A preferred device 600 facilitates installation of the sprinkler 200 by transferring an applied hand torque to install the sprinkler 200 into the branch connector 100 in a fluid tight manner as described herein.

The protective installation device 600 is preferably formed from a polymer or plastic material such as, for example, polyethylene and formed by molding such as, for example, injection molding. The device 600 is preferably formed as a tubular cap having a first end 604 defining an opening for axially receiving the fire protection sprinkler 200 and an opposite second end 606 coaxially centered and axially spaced from the first end 604. The tubular cap 602 defines an internal void 608 and volume for housing a portion of the received sprinkler 200. The tubular cap 602 includes a shielding wall portion 612 that preferably extends between the first end 604 and the second end 606 to define the internal void 608. Moreover, preferred embodiments of the cap 600 and its wall portion 612 define preferred torque assist features 650 of the device 600. Generally, the torque assist feature 650 includes one, and preferably more than one, external rotational drive formations for applying a torque to the sprinkler 200 and one, and preferably more than one, internal rotational drive formations for transferring the applied torque to the sprinkler 200 for rotation within the preferred threaded branch connector 100 to form a fluid tight connection therebetween. For example, the wall 612 of the cap 600 shown defines internal and external torque assist features 650 of the device 600. The external surface of the wall 612 preferably includes a formation in the form of a planar external surface 652 that can serve as a lever surface against which an installer or user can press a thumb or finger(s) to apply a preferred hand torque. Internally, the device 600 includes at least one and preferably includes two diametrically opposed internal gripping formations or portions 654 to grip the sprinkler frame 210. Preferred embodiments of the sprinkler frame 210 include two frame 230a, 230b spaced apart the frame body 212. Each gripping portion 654 defines an internal channel that extends axially preferably from the first end 604 to the second end 606 of the cap 600. The channels of the gripping portion 654 also defines a channel width in the angular direction about the device axis and a channel depth in a radial direction from the device axis. The frame arms 230a, 230b are axially received within the channels of the gripping formations 654. Preferred configurations of the gripping portions 654 channels facilitate the protective device 600 forming a preferred frictional surface engagement with the sprinkler 200 that prevents or minimizes relative rotation between the device 600 and the sprinkler 200 in order to apply the torque to the sprinkler 200 for installation into the preferred branch connector 100 in a fluid tight manner.

With reference to FIGS. 2C and 2D, the protective device 600 is located about the sprinkler 200 to axially extend from the frame body 212 to the fluid deflection member 222. Additionally, the protective device 600 is preferably disposed about the frame 210 to expose the wrench boss of the sprinkler frame for use of the protective device in combination with a wrench to install the sprinkler. Notwithstanding, preferred embodiments of the protected sprinkler assembly 200, 600 are configured for hand installation using the device 600 to form a fluid tight connection with the branch connector 100. The protective device 600 extends axially to the fluid deflection member 222 to house the fluid deflection member 222 and more preferably peripherally surround the fluid deflection member 222. Moreover, the preferred protective device 600 houses and protects the thermally responsive trigger 224. The device 600 preferably tapers or narrows in the axial direction from the first end 604 toward the second end 606. With reference to FIG. 2D, the internal surface of the device 600 can include one or more circumferentially extending ribs or projections to form a surface engagement and more preferably a snap-fit engagement with the fluid deflection member 222 of the inserted sprinkler 200 to secure the device 600 to the sprinkler 200. Additional features of a protective device 600 are shown and described in U.S. Provisional Application No. 63/247,630, filed Sep. 23, 2021, which is incorporated by reference in its entirety.

As described herein, the branch connector 100 includes a preferred internally formed gasket chamber 30 in which an annular seal member 400 is disposed. Firefighting fluid fed into the inlet end 12 flows through the annular seal out the outlet end 14 to supply the sprinkler 200 for discharge and distribution in accordance with the performance specification of the sprinkler 200. As shown in FIG. 3A, the gasket chamber 30 provides for a preferred expansion volume 38 or gap about the seal member 400 into which the seal can expand and/or deform radially outwardly. By providing the radial outward expansion volume 38, the inner area of the annular seal member 400 is maintained and/or maximized so as to minimize or prevent any restriction to the flow therethrough, thereby supplying a flow of fluid to the sprinkler 200 that maintains the discharge and distribution of fluid from the sprinkler 200.

Figure 4:
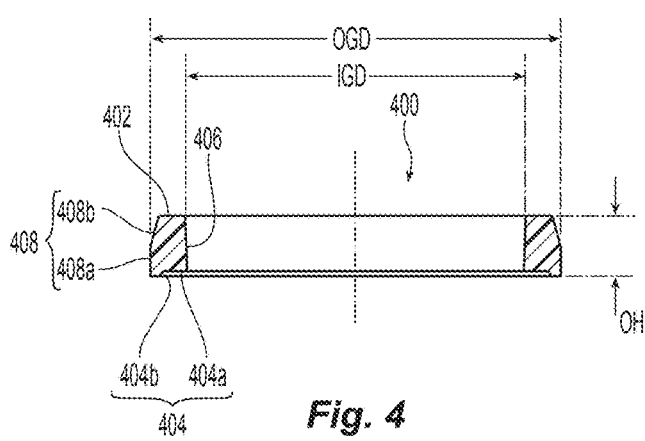
FIG. 4 is a cross-sectional view of a preferred annular seal member for use in the branch connector of FIG. 3A.

Generally, the preferred internal gasket surfaces of the tubular member 10 that form the chamber 30 include two axially spaced apart radial restrictions 32, 34 to radially compress, support and locate the seal member 400 within the gasket chamber 30. The internal surface 15 defining the gasket chamber 30 includes a preferred relief wall 36 that preferably extends between the two restrictions 32, 34 that circumscribes the supported seal member 400 to define a preferred radial expansion volume 38 therebetween. As shown in FIG. 4, the annular seal member 400 includes a peripheral or outer wall surface profile that defines an outer gasket diameter OGD and an inner wall surface profile that defines an internal gasket diameter IGD. Either one or both of the outer and inner gasket diameters OGD, IGD can be constant or alternately vary over the axial length or height of the seal member 400. In preferred embodiments of the annular seal member 400, the inner gasket diameter IGD is 80% of the maximum outer gasket diameter OGD. FIG. 3A illustrates the preferred branch connector without a sprinkler threaded into the outlet end 14. Under such a condition, the annular seal member 400 is housed within the chamber 30 in an undeformed unloaded state.

Figure 2A:
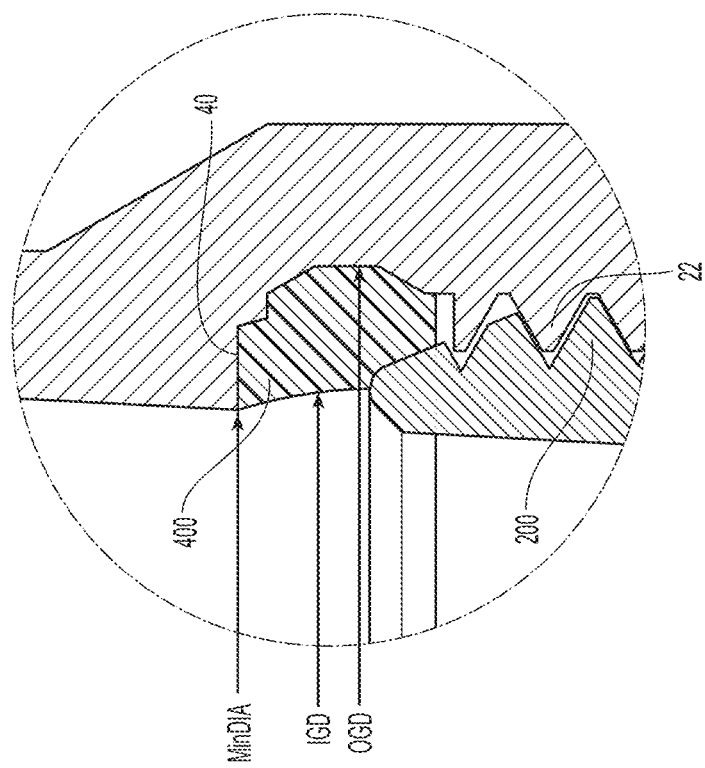
FIG. 2A is a partial illustrative detailed cross-sectional view showing an annular seal member loaded by the connected device in the branch connector of FIG. 2.
Figure 2:
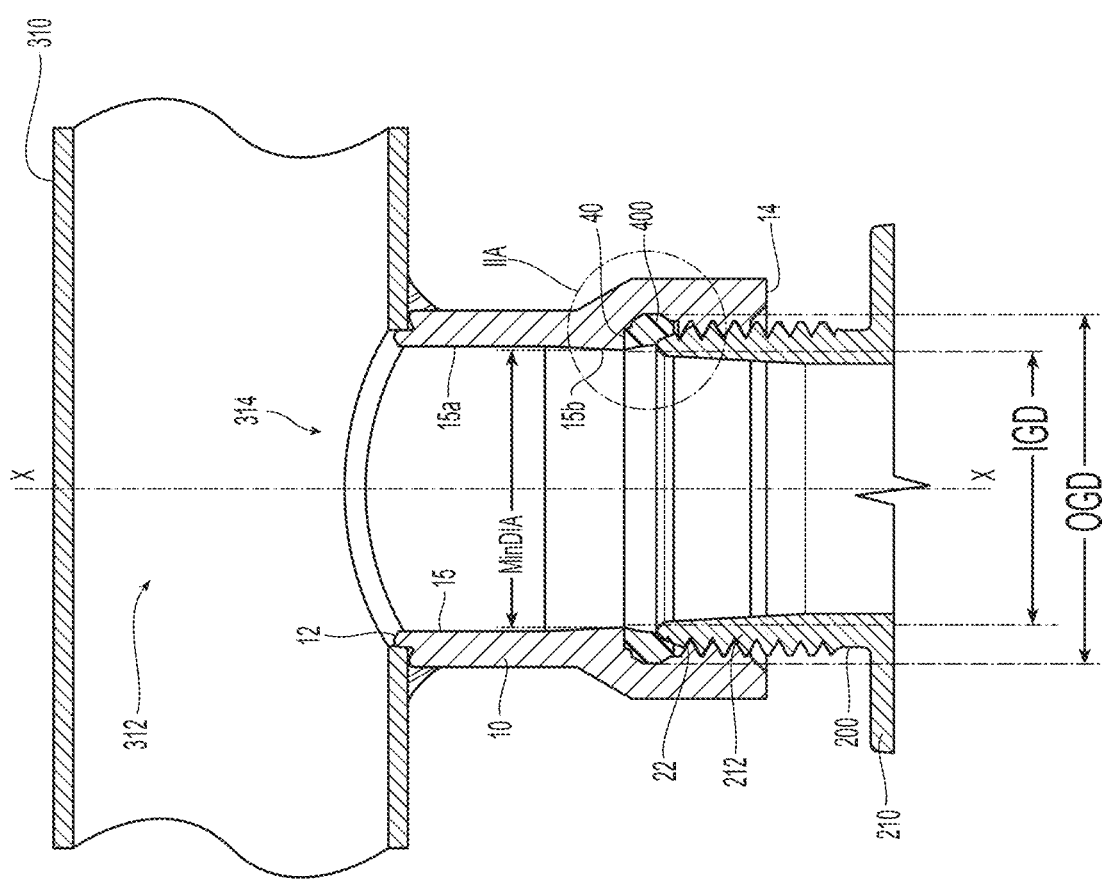
FIG. 2 is a partial cross-sectional view illustrating connection of the fire protection device to the pipe header using the branch connector of FIG. 1A.
Figure 2B:
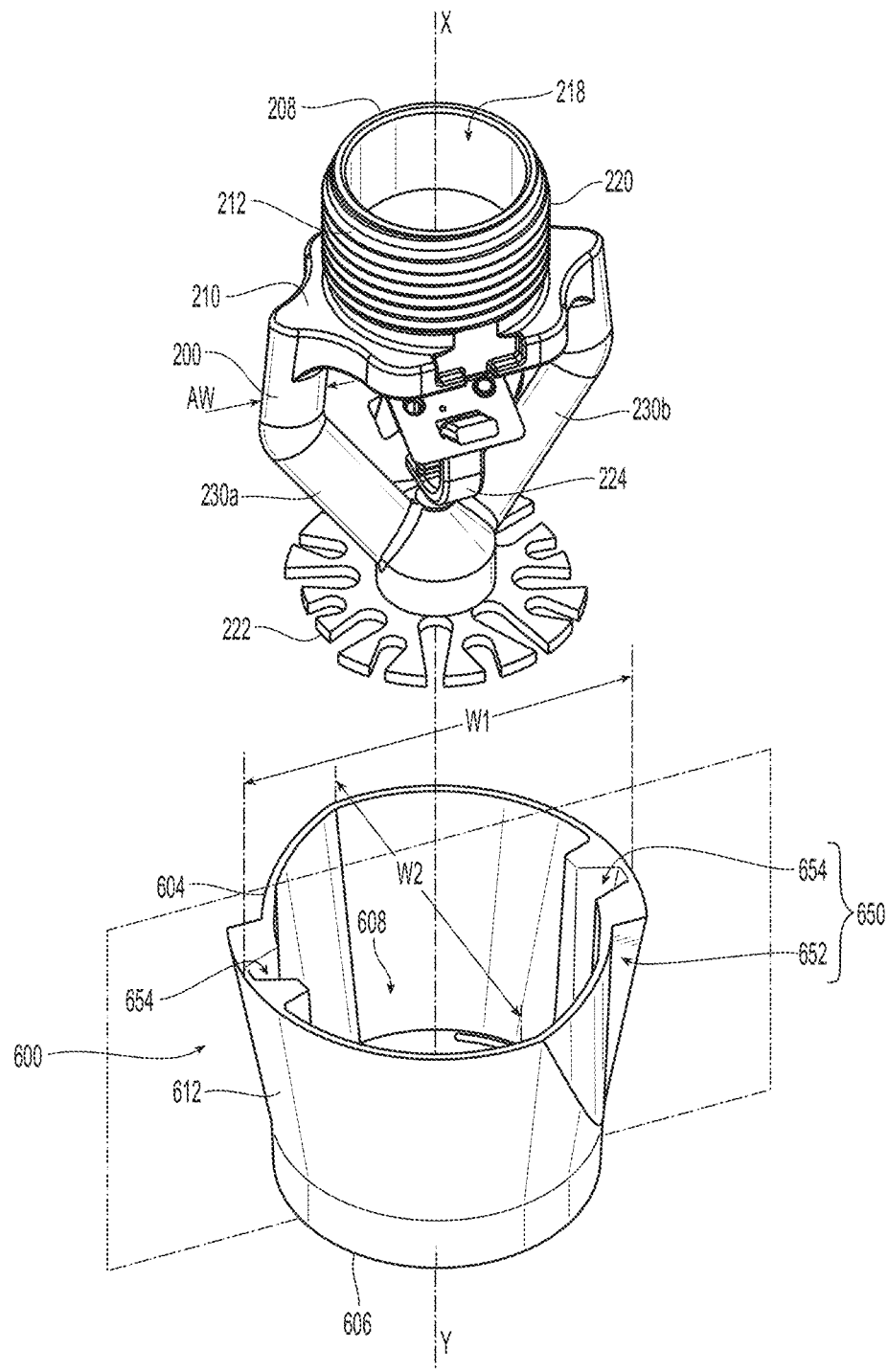
FIG. 2B is a perspective exploded view of the preferred embodiment of the device of FIG. 1A and a preferred protective installation device for use in the system of FIG. 1.
Figure 2C:
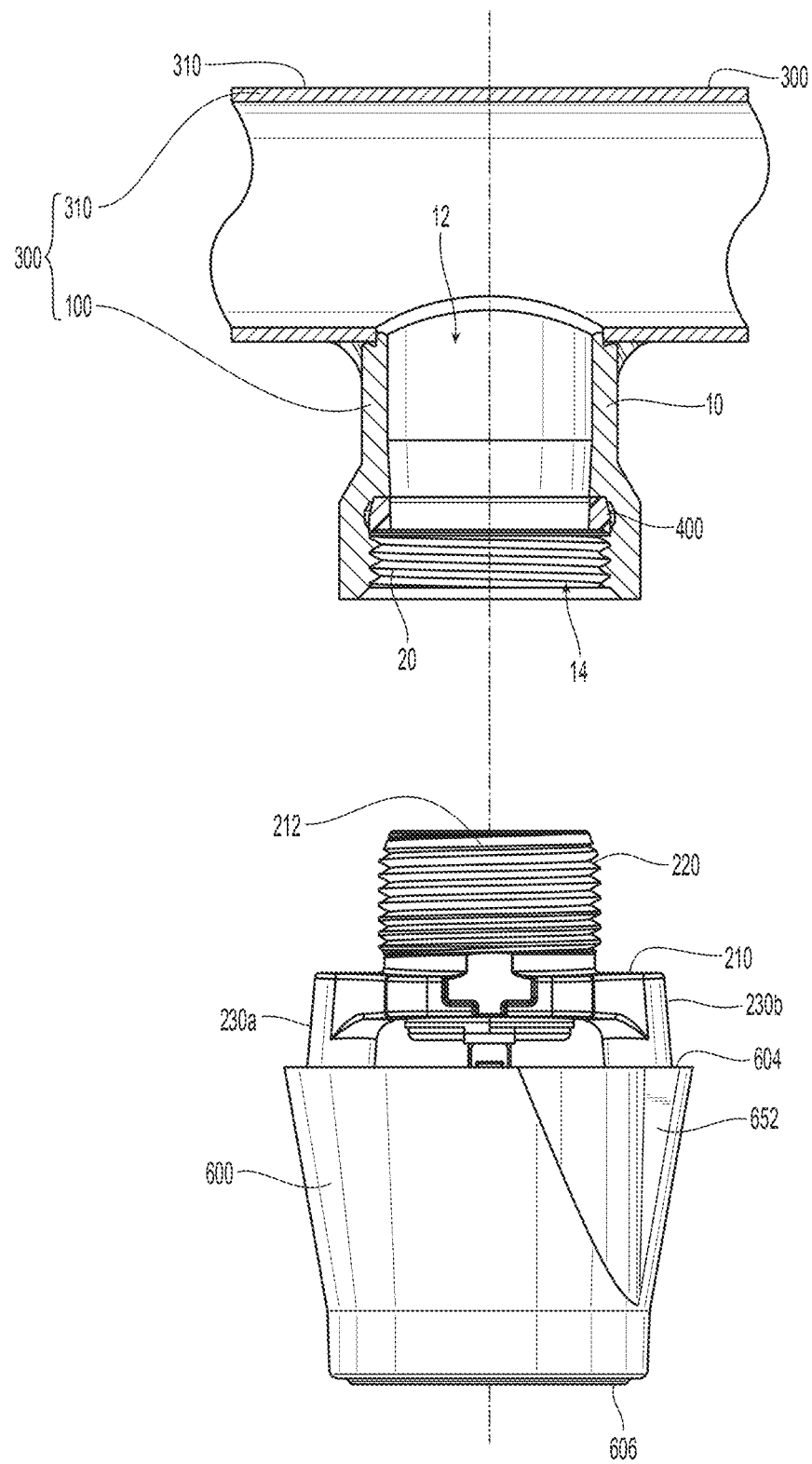
FIG. 2C is a partial illustrative cross-sectional exploded view of the protected device assembly of FIG. 2B, pipe header and the preferred branch connector of FIG. 2.
Figure 2D:
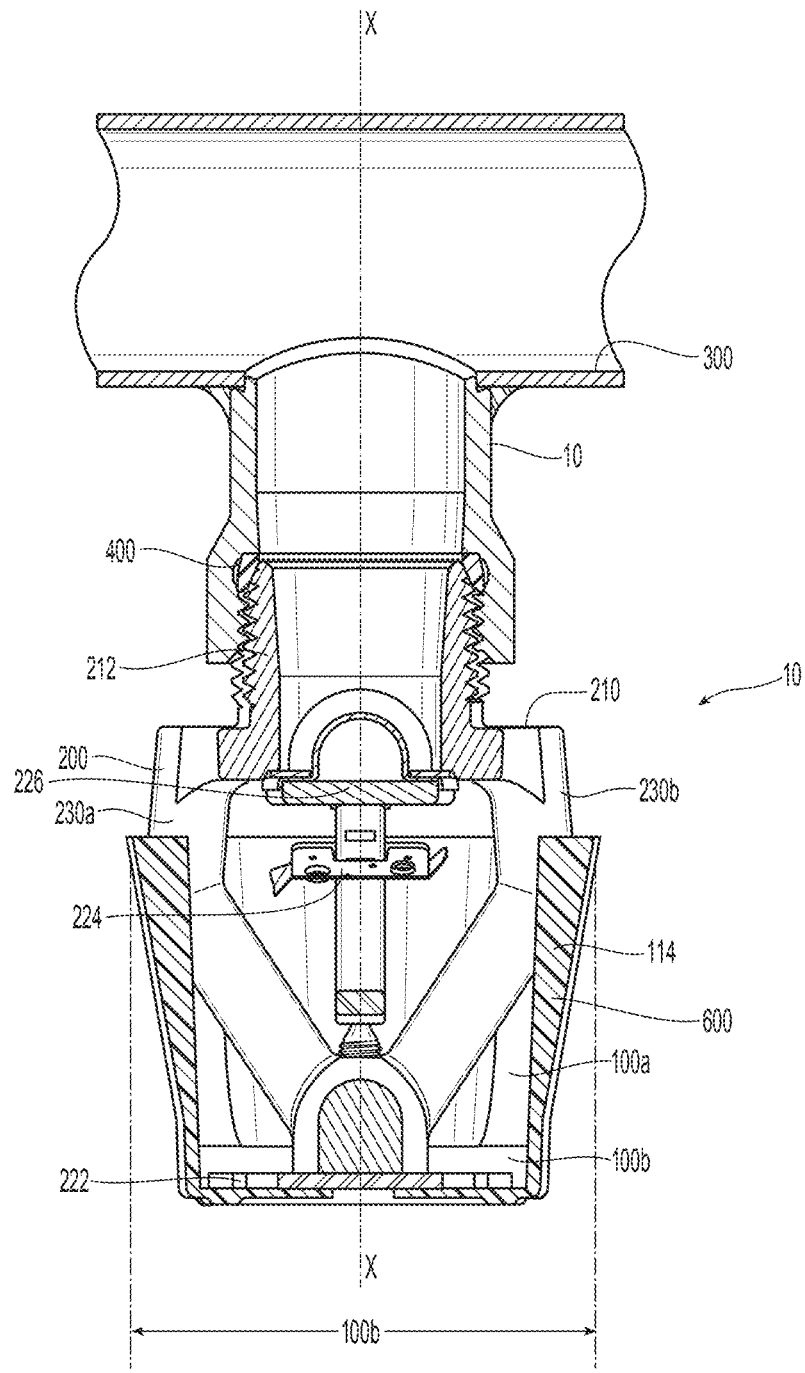
FIG. 2D is a partial illustrative cross-sectional view of the interconnected protected device assembly of FIG. 2B, pipe header and the preferred branch connector of FIG. 2.

Shown in FIGS. 2 and 2A is the cross-sectional view of the connector 10 with the sprinkler 200 threaded into the outlet end 14 and in sealed engagement with the seal member 400. In this loaded state, the annular seal member 400 compresses and deforms by expanding radially outward into the expansion volume 38 increasing the outer diameter of the gasket OGD. Moreover, by providing the radial outward expansion, the inner diameter IGD of the seal member 400 in the loaded state is preferably greater than or equal to a preferred minimum diameter MinDIA of the internal passageway 16 to maintain a preferred fluid flow through the annular member 400 and supplied to the fluid distribution device 200. The minimum diameter MinDIA of the internal passageway 16 is preferably larger than the nominal size of the sprinkler thread received at the internally threaded portion 20 preferably by a difference that ranges from 5-25%. Moreover, the difference between the minimum diameter MinDIA varies inversely with the nominal sprinkler size threaded into the outlet end 14. In a preferred example, for a nominal sprinkler size of ½ inch, the minimum diameter MinDIA of the internal passageway 16 is 20-25% greater; for a nominal sprinkler size of ¾ inch, the minimum diameter MinDIA is about 10% greater; and for a nominal sprinkler size one inch, the minimum diameter MinDIA of the internal passageway 16 is slightly less by about 10% and more preferably less within a range of 5% to 10%.

Preferably, a portion of the second segment 15b of the internal surface 15 proximate to or along the tapering part 18b of the fluid intake portion 18 defines the preferred minimum diameter MinDIA of the internal passageway 16. The backstop surface 40 of the gasket chamber 30, against which the annular seal member 40 seals, is preferably formed between the first restriction 32 and the fluid intake portion 18. Preferably, the backstop surface 40 is a planar annular surface formation that is disposed perpendicular to and circumscribed about the central longitudinal axis X-X and is contiguous with a terminal end of the second segment 15b of the internal surface 15 forming the tapering part 18b of the fluid intake portion 18. In preferred embodiments of the internal gasket chamber 30, the annular backstop surface 40 and its internal diameter defines the preferred minimum diameter MinDIA of the internal passageway 16.

Figure 3B:
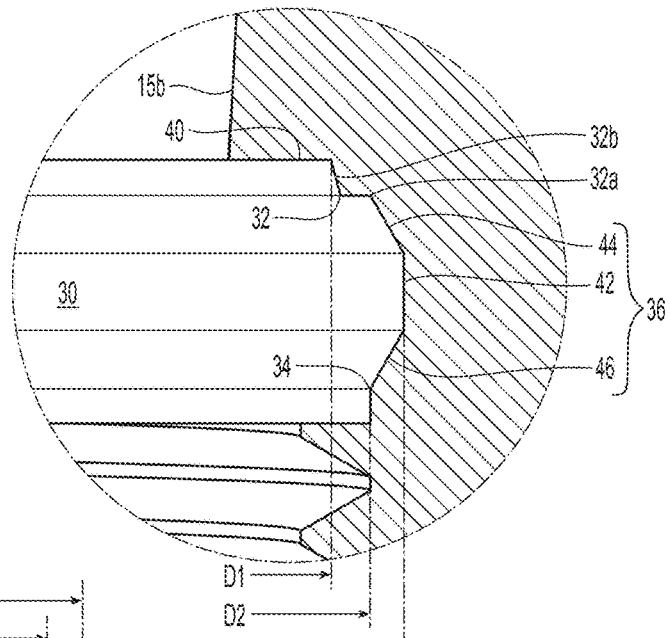
FIG. 3B is a detailed cross-sectional view of the branch connector in FIG. 3A.

Shown in FIGS. 3A and 3B are cross-sectional and detailed cross-sectional views of the branch connector 100 and the gasket chamber 30. The first restriction 32 of the internal gasket chamber 30 is preferably formed proximate the fluid intake portion 18 and the second restriction 34 is preferably formed proximate the internal threaded portion 20. More preferably, the first restriction 32 and the second restriction 34 are formed between the backstop 40 and the internal threaded portion 20. The relief wall 36 preferably approximates a concave surface that axially extends between the first restriction 32 and the second restriction 34 for defining the expansion volume 38 about the annular seal member 400. The preferred concave relief wall 36 is preferably defined by a plurality of adjacent surfaces of the internal surface 15 that circumscribe the central longitudinal axis X-X. The surfaces defining the relief wall 36 can also provide bearing surfaces against which the annular seal member 400 can rest in the loaded state of the seal member 400.

As seen in FIG. 3B, the plurality of adjacent surfaces preferably includes a central surface 42 that in cross-section extends axially parallel to the central longitudinal axis X-X and a pair of skewed surfaces 44, 46 disposed about and preferably contiguous with the central planar surface 42 that are circumscribed about and skewed with respect to the central longitudinal axis X-X. The concave relief wall 36 is preferably symmetrical about a plane disposed perpendicular to the central connector axis X-X and bisecting the central surface 42. In the preferred embodiment, the first skewed surface 44 is preferably proximate the backstop surface 40 with the second restriction 32 therebetween. The second skewed surface 46 is preferably adjacent and contiguous with the second restriction 34. Each of the restrictions 32, 34 are annular surfaces preferably circumscribed about the central longitudinal sprinkler axis X-X. Each of the annular restrictions 32, 34 or a portion thereof can extend axially parallel to the central longitudinal axis X-X. In the preferred embodiment, the restrictions 32, 34 are variably configured. For example, as seen in FIG. 3B, the first restriction 32 includes a first portion 32a disposed perpendicular to the central longitudinal axis X-X and a second portion 32b adjacent and contiguous with the backstop surface 40, with the second portion 32b being skewed with respect to the central longitudinal axis. In a dissimilar manner, the second restriction 34 is defined by a surface extending axially parallel to and circumscribed about the central longitudinal axis X-X.

Under load, the preferred geometry of gasket chamber 30 in combination with the preferred geometry of the seal member 400 provides for radial outward deformation of the seal member 400 minimizing or eliminating interference with the flow of water through the annular seal member 400. The annular seal member 400 is preferably configured as the seal shown and described in U.S. Pat. No. 10,744,527 to provide a preferred leak-proof connection between a fire protection sprinkler or other fire protection device 200 and the branch connector 100. The material employed for seal member 400 is an EPDM material having a durometer hardness of from 65 to 80, and preferably 70, to provide the desired sealing function and maintain sprinkler position. With reference to FIG. 4, the preferred annular seal member 400 preferably includes a first annular seat 402 for sealing against the backstop surface 40 of the connector 10 and a second annular seat 404 axially spaced from the first seat 402 for receipt of a fluid distribution device 200 in a sealed engagement. The first annular seat 402 and the second annular seat 404 are axially spaced apart from one another to define an overall height OH of the annular seal member 400. The first annular seat 402 is preferably planar and disposed perpendicular to the longitudinal axis. The second annular seat 404 preferably includes a first planar portion 404a that is parallel to the first seat 402 and a second portion 404b that is skewed with respect to the first portion 404a to define an annular lip that is configured to surround the thread of the received fluid distribution device 200. The first planar portion 404a engages the annular tip of the frame body 212 of a threaded fire protection device 200 to seal the connection between frame body 212 and the tubular member 10. The preferably skewed second portion 404b is tapered outwardly to allow easy insertion of the tip of the frame body 212 into the seal 400 without damage. The first planar portion 404a is preferably spaced from the first annular seat 402 at a distance of 90%-95% of the overall height OH of the seal member 400 and more preferably spaced from the first annular seat 402 at a distance of 91%-92% of the overall height OH. Extending between the first and second seats 402, 404 is a preferred inner surface or wall 406 and a preferred peripheral surface or wall 408. The inner wall 406 is preferably skewed with respect to the first planar annular seat 402 to define a tapering flow through region of the seal member 400 that narrows in the direction from the first seat 402 toward the second seat 404. In a preferred embodiment, the inner wall 406 defines a preferred skew angle with the first seat 402 that ranges from 85-90 degrees; and more preferably is preferably 88 degrees. The outer peripheral wall 408 includes a first cylindrical portion 408a and a second conical frustum shaped portion 408b. Accordingly, the first cylindrical portion 408a defines a preferred constant outer diameter OGD and the conical portion 408b defines a variable outer diameter OGD that preferably decreases from a maximum at the diameter of the cylindrical portion to a minimum at the first seat 402. When the seal member 400 is installed in the branch connector 100, the first restriction 32 preferably engages the second portion 408b of the seal member and the second restriction 34 preferably engages the first portion 408a of the seal member to support the seal member 400 within the gasket chamber 30. In a preferred embodiment where the second portion 408b of the peripheral wall defines a preferred minimum outer diameter OGD of the seal member 400, the minimum outer diameter OGD is preferably 95%-96% of the constant outer diameter OGD defined by the first portion 408a of the peripheral wall 408.

In a preferred embodiment of the branch connector 100, the internally threaded portion 20 defines a nominal one inch internal straight thread, the overall seal member height is about 0.2 inches, the constant outer diameter of the seal member is about 1.3 inches and the inner gasket diameter is about 1.1 inches.

Dimensionally, each of the first restriction 32 and second restriction 34 defines an internal diameter of the passageway 16 that is respectively preferably slightly less than the outer diameter OGD of the engaged portion 408a, 408b seal member 400 to radially compress the seal member 400. Preferably, the outer diameter of the seal member 400 and the smaller of the internal diameters of the restrictions 32, 34 define a differential therebetween that ranges from 0.01-0.1 inch. Moreover, in the preferred embodiment of the connector 10, the first restriction 32 defines an internal diameter D1 that is less than the internal diameter of the second restriction 34. The preferred central surface 42 of the relief wall 36 defines an internal diameter D3 that is greater than the maximum outer diameter of the unloaded seal member 400 to define the radial thickness of the expansion void 38 therebetween. In a preferred embodiment of the branch connector 100, the relief wall 36 defines an internal diameter D3 that is about 3% greater than the maximum gasket outer diameter OGD of the unloaded seal member 400. Preferably, the outer diameter of the unloaded seal member 400 and the larger inner diameter D3 of the central surface 42 define a preferred differential therebetween of about 0.05.

Figure 5A:
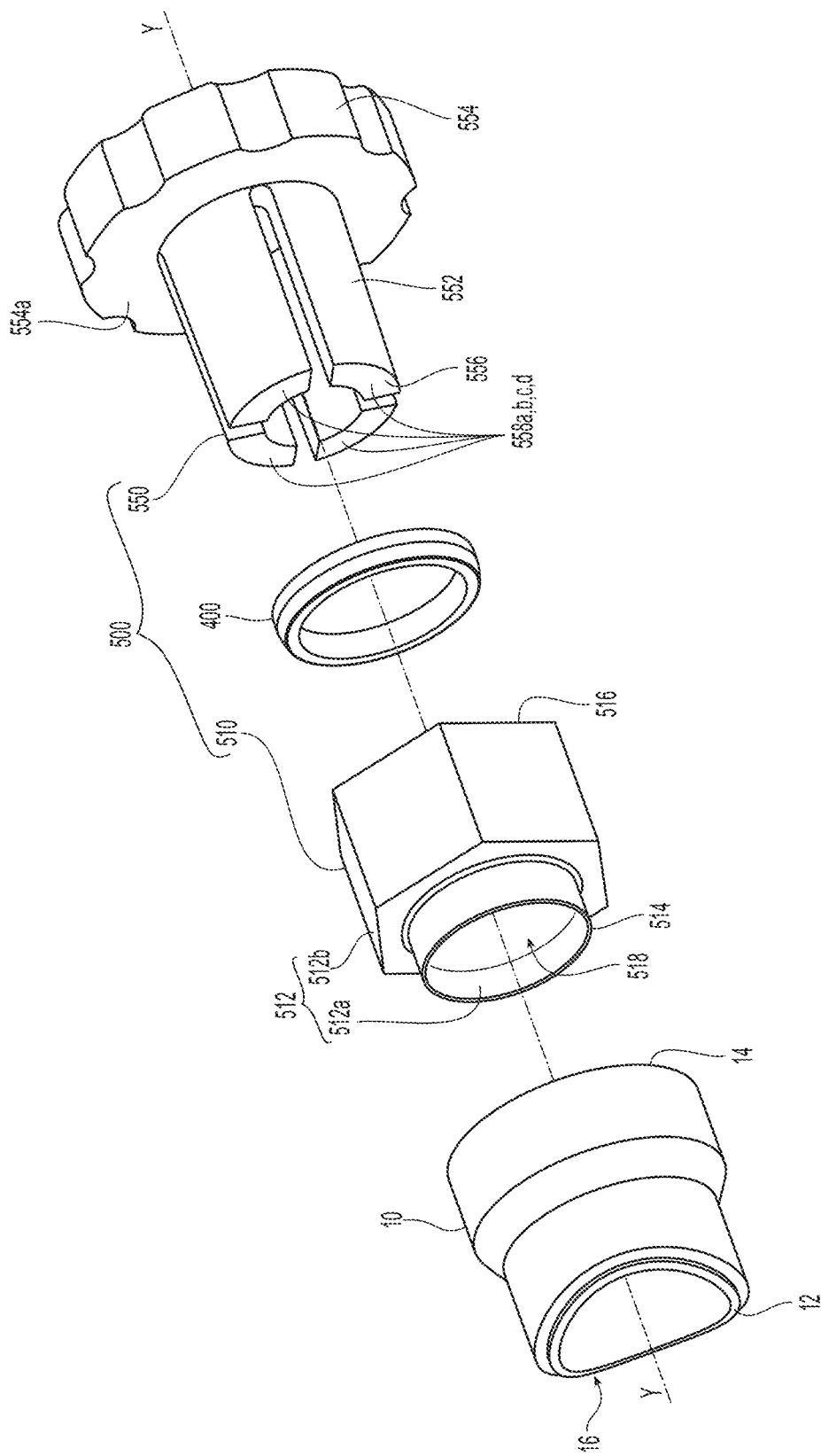
FIG. 5A is an exploded perspective view of a preferred installation tool for use with the branch connector of FIG. 3A.
Figure 5B:
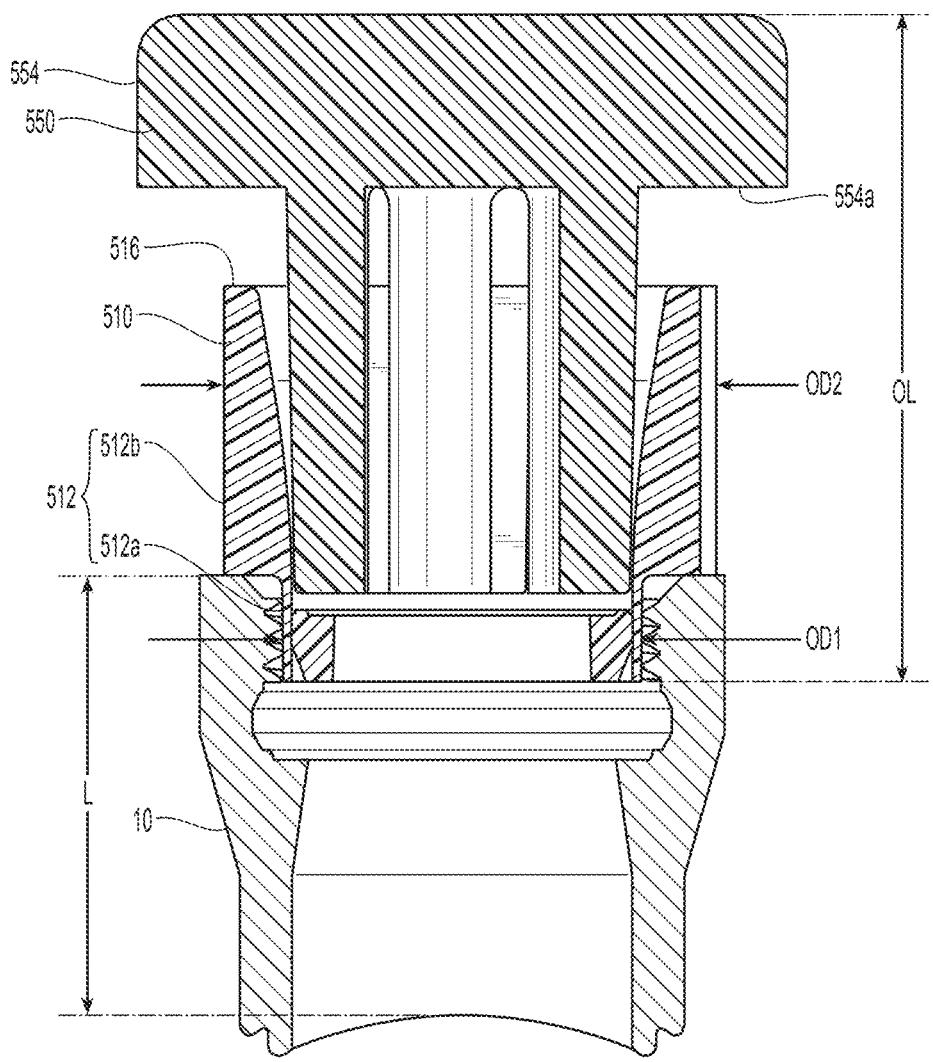
FIG. 5B is a cross-sectional view of the preferred installation tool and branch connector of FIG. 5A.
Figure 5C:
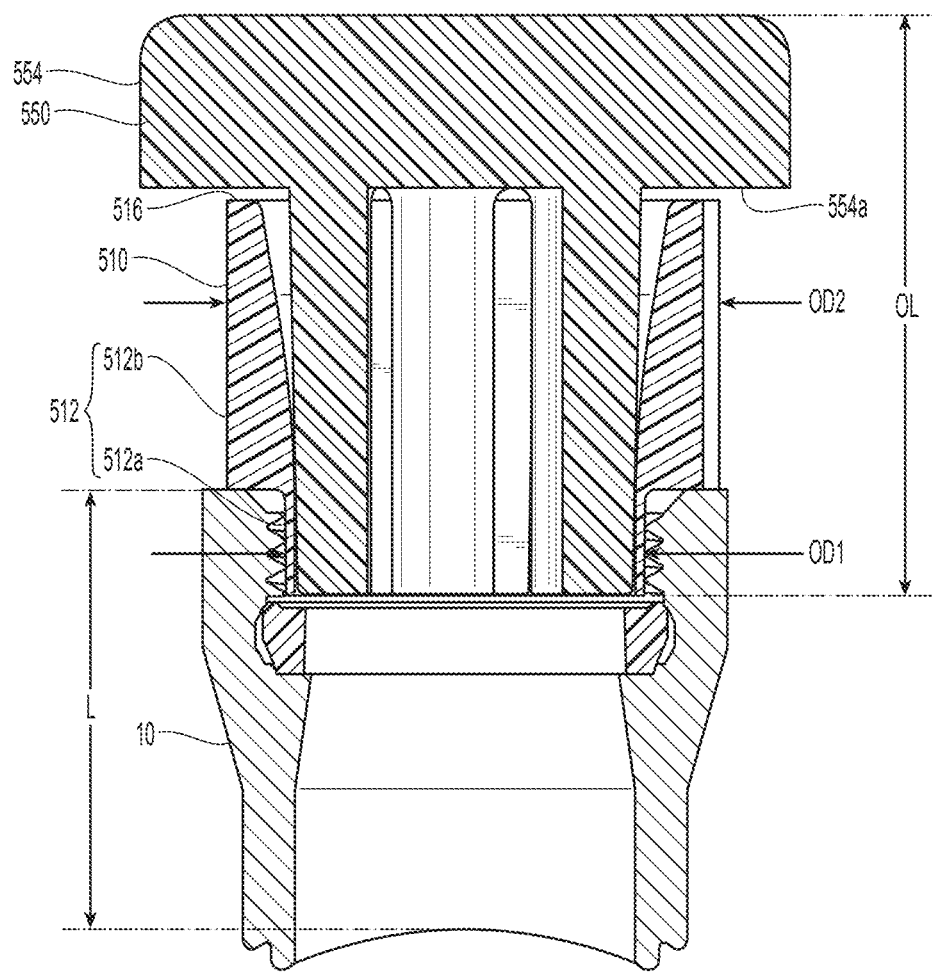
FIG. 5C is another cross-sectional view of the preferred installation tool and branch connector of FIG. 5A.

The gasket chamber 30 of the branch connector 100 defines a surface geometry and internal volume that supports and houses the annular seal member 400 in the unloaded state and provides the expansion volume 38 in which the seal member 400 is displaced in the loaded state of the annular seal member 400. Shown in FIGS. 5A, 5B and 5C is a preferred installation tool 500 for installing and locating the preferred annular seal member 400 within the gasket chamber 30. The preferred installation tool 500 includes a nozzle member 510 and a plunger member 550. The nozzle member 510 is generally a tubular body 512 having a first end face 514 and a second end face 516 axially spaced from the first end face 514 with an internal passageway 518 that extends axially from the first end face 514 to the second end face 516 along a central longitudinal axis Y-Y. The plunger member 550 is generally an axially extending member having a rod portion 552 with a handle portion 554 preferably formed or affixed at one end of the rod portion 552 with a free end 556 formed or provided opposite the handle portion 554.

In the preferred interconnection assembly, the branch connector 100 and its inlet end 12 can be coupled or affixed to a pipe header 310 or otherwise free for connection at a later time. The annular seal member 400 is disposed or held within and coaxially aligned within the internal passageway 518 of the nozzle member 510. The first end face 514 of the nozzle member is inserted into the outlet end 14 of the branch connector 100 which coaxially aligns the internal passageway 518 of the nozzle member 510 with the internal passageway 16 of the branch connector 100. The plunger member 550 is also coaxially aligned with the internal passageways of the nozzle member 510 and branch connector 100 by locating the rod portion 552 of the plunger member 550 within the nozzle 510 proximate the seal member 400 in a preferred sliding engagement. In operation, the plunger member 550 is axially depressed to axially slide or drive the rod portion 552 within the internal passageway 518 to drive and eject the annular seal member 400 out of the nozzle member 510 and into the preferred branch connector 100. More preferably, the relative translation between the nozzle and plunger members 510, 550 defines a first position of the handle portion 554, as seen in FIG. 5B, axially spaced from the second end face 516 of the nozzle member 510 with the free end 556 of the rod portion 552 proximate the annular seal member 400 within the internal passageway 518. The first position defines a first operational length OL between the handle portion 554 and the first end face 514. The sliding engagement also defines a second position of the handle portion 554 proximate, and more preferably abutting, the second end face 516 of the nozzle member 510, as seen for example in FIG. 5C, such that the free end 556 ejects the annular seal member 400 out of the internal passageway 518 and into the desired location within the internal gasket chamber 30 of the branch connector 100. In each of the first and second positions, the handle portion remains centered and coaxially aligned with the central axis Y-Y. In a preferred aspect of the second position, the free end 556 of the rod portion 552 is flush with the first end face 514 of the nozzle member. Alternatively or additionally, the rod portion 552 of the plunger member 550 can form an interference fit within the internal passageway 518 of the nozzle 510 to limit the axial travel of the plunger 550 within the nozzle 510 and define the second position of the handle portion 554.

The tool assembly 500 is preferably configured for use to replace an annular seal member 400 of a branch connector 100 connected to an installed pipe header 310. Accordingly, the tool assembly 500 is preferably dimensioned to be sized and operate within a space that may include obstructions around the pipe header. Each of the nozzle member 510 and plunger member 550 defines an axial length that is 0.75 to 1.25 times the axial length L of the branch connector 100. Moreover, the operational length OL of the installation tool 500 preferably ranges from a maximum length of three to two and one-half times (3×-2-½×) the axial length L of the branch connector 100 when the handle portion 554 is in the first position to a minimum of 1.5 to 1 times (1.5×-1×) the length L of the branch connector 100 when the handle portion 554 is in the second position. The preferred operational length OL of the tool assembly allows operation of the tool assembly in close proximity of obstructions to the pipe header 310 such as, for example, ceilings or ducts. The handle portion 554 is preferably configured for peripheral gripping with a continuous preferably uniform peripheral contour circumscribed about the device axis. The handle portion 554 has a preferred width diameter that is greater than the collective diameter or width of the rod portion 552 and its projection members. Accordingly, the handle portion 554 includes a transvers base surface 554a to which the projection members are preferably affixed. The exposed radially extending base surface contacts the nozzle 510 in the second operational position of the handle 550. Moreover, the handle portion 554 has a preferred diameter that is preferably less than the operational length of the tool assembly and preferably 50% to 100% of the axial length of the tool length when the handle 554 is in the second position. Moreover, the handle portion 554 has a preferred axial thickness or height that is less than the rod portion 552 of the plunger 550 and more preferably has an axial length that is 25% to 33% the axial length of the rod portion 552 and even more preferably 15% to 25% the axial length of the rod portion 552.

Preferred features of the branch connector 100 and the installation tool 500 are shown. The rod portion 552 preferably includes a plurality of spaced apart projection members 558 that extend axially from the handle portion 554. More preferably, each of the axially extending projection members 558 are elongated and arcuate having a common central axis of curvature shown coaxially aligned with the central axis Y-Y. In the preferred embodiment, the rod portion 552 is defined by four arcuate members 558a, 558b, 558c, 558d that are arranged to partially circumscribe the central axis Y-Y. The free end of each member 558 provides a planar surface to contact the seal member 400 and displace it out of the nozzle member 510.

The internal passageway 518 of the nozzle member 510 defines a preferred guidance channel for holding the annular seal member and through which the plunger member slides to displace the annular member 400 in a preferred orientation for insertion into the gasket chamber 30 of the branch connector 100. In the preferred embodiment, the guidance channel 518 is preferably tapered in the direction from the receiver or second end 516 of the nozzle member toward the insertion or first end 514. More preferably, the guidance channel 518 includes a first tapering portion having an internal diameter that is preferably wide enough at the receiver end 516 to sequentially insert the annular seal member 400 and the plunger 550. A second portion of the channel 518 is defined by the narrowest portion of the channel to permit the annular seal member 400 to be coaxially oriented and centered about the central axis of the nozzle member 510 while being wide enough to permit the seal member 400 to be ejected under the displacement of the plunger member 550. The narrowest portion of the guidance channel 518 can support the annular seal member 400 in the preferred orientation. Moreover, the narrowest portion of the channel 518 preferably radially compresses the spaced apart projection members 558 towards one another to collectively present the free end 556 of the plunger member 550 to the sealing surface of the seal member 400. The narrowest portion of the passageway 518 preferably extends axially to the insertion end 514 at a constant internal diameter to maintain the seal in the preferred coaxially aligned orientation for ejection from the insertion end 514 and into the gasket chamber 30 of the branch connector 100. In a preferred aspect of the tool 500, the seal does not fold upon itself so that it may be ejected and inserted in the desired orientation.

The preferred nozzle member 510 has an outer geometry that facilitates its use with the branch connector 100 and the plunger member 550. The tubular body 512 of the nozzle member 510 preferably includes a first portion 512a defining a first outer diameter preferably sufficient to be axially inserted into the branch connector 100 and a second portion 512b defining a second larger outer diameter that limits the insertion of the nozzle 510 into the branch connector 100. The first outer diameter OD1 of the first portion 512a is preferably sized so that the first portion 512a can be inserted by sliding the first portion 512a into the threaded outlet portion at the outlet 14 of the branch connector 100. More preferably, the first outer diameter OD1 is sized to form a sliding contact engagement with the internal thread of the outlet portion 20 of the branch connector 100 which facilitates the coaxial alignment of the internal passageway 518 of the nozzle member 510 with the internal passageway 16 of the branch connector 100. To axially limit the insertion of the nozzle member 510, the second outer diameter OD2 is preferably larger than the outlet opening 14 of the branch connector 100. As seen in FIG. 5B, the second portion 512b preferably defines a stop surface about the body 512 that abuts the outlet end face of the branch connector upon the insertion of the first portion 512a into the threaded portion of the branch connector 100.

The insertion portion 512a of the nozzle member 510 defines an axial length that is preferably equal to the axial length of the internal thread of the branch connector 100. In the preferred embodiment, the complete insertion of the first portion of the nozzle member 510 into the branch connector 100 preferably locates the inserted end face 514 of the nozzle member outside and proximate to, and even more preferably immediately next to, the internal gasket chamber of the branch connector 100. The preferred inserted location of the end face of the nozzle facilitates the insertion of the annular member 400 into the gasket chamber 30 upon the ejection from the nozzle guidance channel 518.

It should be understood that any numerical range, value, dimension or percentage value or approximation thereof provided herein can vary by ±10% unless otherwise already understood and established by accepted industry or manufacturing standards.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A fire protection system comprising:
   a pipe header having an internal fluid passageway extending along a longitudinal axis, the pipe header having an opening formed therein radially about the longitudinal axis;
   a branch connector including a unitary tubular member having a first terminal end, and a second terminal end spaced from the first terminal end, the unitary tubular member including an internal gasket chamber surface between the first terminal end and the second terminal end with a single annular seal member housed in the tubular member and supported therein by the internal gasket chamber surface, an internally threaded surface between the internal gasket chamber surface and the second terminal end, and an internal stepless surface extending from the first terminal end to the internal gasket chamber surface, the first terminal end being connected about the opening in the pipe header with the stepless surface in fluid communication with the internal fluid passageway of the pipe header; and
   a fire protection device comprising a frame having a frame body with a frame inlet, a frame outlet and a frame internal passageway extending from the frame inlet to the frame outlet along an axis of the fire protection device, the frame body being in a threaded engagement with the internally threaded surface of the tubular member to establish the frame internal passageway of the fire protection device in fluid communication with the internal fluid passageway of the pipe header;
   wherein the fire protection device includes a fluid deflection member coupled to the frame and a protective cap disposed about the frame and the fluid deflection member,
   wherein the protective cap includes an internal surface for engaging the frame and an external surface for applying a manual torque to the protective cap to thread in the fire protection device into engagement with the internally threaded surface of the tubular member, and
   wherein the internal surface transfers the manual torque from the external surface of the protective cap to the frame of the fire protection device to compress the single annular seal member and provide a fluid tight seal between the fire protection device and the branch connector.

2. A method of providing a fire protection system comprising:
   placing a single annular seal member in an unloaded condition within an internal gasket chamber of a unitary tubular member formed along an internal surface extending along and circumscribed about a central axis, the internal gasket chamber being located between an internally straight threaded surface and an internal stepless surface of the internal surface, the internally straight threaded surface being between the internal gasket chamber and a terminal outlet end of the unitary tubular member, the internal stepless surface extending from the gasket chamber to a terminal inlet end of the unitary tubular member in a fixed connection to a pipe header of a network of pipes; and
   placing the single annular seal member in a loaded condition within the internal gasket chamber with a fire protection device frame having a tapered thread in threaded engagement with the internally straight threaded surface;
   wherein placing the single annular seal member in the loaded condition includes torquing the fire protection device by hand with a protective cap disposed about the fire protection device.

3. The system of claim 1, wherein the first terminal end being connected about the opening in the pipe header comprises the first terminal end being welded about the opening in the pipe header.

4. The system of claim 1, wherein the frame of the fire protection device includes frame arms coupled to the fluid deflection member and wherein the protective cap frictionally engages the frame arms.

5. The system of claim 4, wherein the internally threaded surface of the tubular member comprises a straight thread, and wherein the fire protection device comprises an external tapered thread for engagement with the straight thread.

6. The method of claim 2, wherein the terminal inlet end of the unitary tubular member in a fixed connection to the pipe header comprises the terminal inlet end of the unitary tubular member in a welded connection to the pipe header.

7. The method of claim 2, wherein the fire protection device includes a fluid deflection member supported by frame arms, and wherein the protective cap surrounds the fluid deflection member and frictionally engages the frame arms.

8. A method of providing a fire protection system having a network of pipes connecting fire protection devices to a source of firefighting fluid, the network of pipes including branch lines, the method comprising:
   forming a plurality of branch lines, wherein the forming of each branch line comprises:
   securing a tubular member to a pipe header, the tubular member including a single gasket chamber formed along an internal passage extending along and circumscribed about a central axis, the single gasket chamber being located between a first terminal end and a second terminal end of the tubular member, an internally straight thread between the single gasket chamber and the second terminal end of the tubular member, an internal surface of the internal passage extending from the single gasket chamber to the first terminal end of the tubular member, and
   placing a single annular seal member in an unloaded condition within the single gasket chamber; and placing the single annular seal member in a loaded condition within the single gasket chamber,
wherein the placing the single annular seal member in a loaded condition comprises:
engaging a thread of a fire protection device with the internally straight thread of the tubular member, and
applying a manual torque to a protective cap in frictional engagement with frame arms of the fire protection device.

9. The method of claim 8, wherein securing the tubular member to the pipe header comprises welding the first terminal end about an opening in the pipe header.

10. A method of providing a fire protection system comprising:
placing a single annular seal member in an unloaded condition within a single internal gasket chamber of a tubular member formed along an internal passageway extending along and circumscribed about a central axis between a terminal inlet end and terminal outlet end of the tubular member, an internally threaded surface located between the single internal gasket chamber and the terminal outlet end of the tubular member, the terminal inlet end of the tubular member connected to a pipe header; and
placing the single annular seal member in a loaded condition within the single internal gasket chamber with a fire protection device, the fire protection device having a thread for threaded engagement with the internally threaded surface of the tubular member and a protective cap disposed about the fire protection device, the protective cap including an internal surface with a torque assist feature for applying a torque to a frame of the fire protection device;
wherein the placing the single annular seal member in the loaded condition consists of:
manually torquing the protective cap to compress the single annular seal member and provide a fluid tight seal between the fire protection device and the tubular member.

11. The method of claim 10, wherein the fire protection device includes a fluid deflection member coupled to frame arms, and wherein the protective cap surrounds the fluid deflection member and frictionally engages the frame arms.

12. The method of claim 10, wherein the internally threaded surface of the tubular member comprises a straight thread, and wherein the thread of the fire protection device comprises an external tapered thread for engagement with the straight thread.

13. A fire protection system, comprising:
a pipe having an internal fluid passageway extending along a longitudinal axis;
a connector including a tubular member having an internal passageway between a first terminal end and a second terminal end spaced from the first terminal end, the internal passageway including an internal surface between the first terminal end and the second terminal end that supports a single annular seal member, an internally threaded surface between the single annular seal member and the second terminal end, the first terminal end being connected to the pipe to establish fluid communication between the internal passageway of the tubular member and the internal fluid passageway of the pipe; and
a fire protection device comprising a body with an inlet, an outlet, an internal fire protection device passageway extending from the inlet to the outlet along an axis of the fire protection device, the body being in a threaded engagement with the internally threaded surface of the tubular member to establish fluid communication between the internal fire protection device passageway of the fire protection device and the internal passageway of the tubular member;
wherein the fire protection device includes a protective cap with an internal surface for applying a manual torque to the fire protection device to compress the single annular seal member and provide a fluid tight seal between the fire protection device and the connector.

14. The system of claim 13, wherein the fire protection device includes frame arms coupled to a fluid deflection member, and wherein the protective cap surrounds the fluid deflection member and frictionally engages the frame arms.

15. The system of claim 13, wherein the internally threaded surface of the tubular member comprises a straight thread, and wherein the fire protection device comprises an external tapered thread for engagement with the straight thread.

* * * * *